(12) United States Patent
Ito et al.

(10) Patent No.: US 7,281,944 B2
(45) Date of Patent: Oct. 16, 2007

(54) INFORMATION PROCESSING APPARATUS HAVING BATTERY AND PRINTED CIRCUIT BOARD

(75) Inventors: Katsunori Ito, Kawasaki (JP); Masahiko Kyouzuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/458,598

(22) Filed: Jun. 10, 2003

(65) Prior Publication Data

US 2003/0228790 A1 Dec. 11, 2003

(30) Foreign Application Priority Data

Jun. 11, 2002 (JP) ............... 2002-170548

(51) Int. Cl.
*H01R 3/00* (2006.01)
(52) U.S. Cl. ..................................... 439/500
(58) Field of Classification Search ................ 439/79, 439/80, 383, 500, 948, 78; 362/184
See application file for complete search history.

(56) References Cited

U.S. PATENT DOCUMENTS

| | | | | |
|---|---|---|---|---|
| 4,678,121 A | * | 7/1987 | Douty et al. | ................ 439/610 |
| 5,505,629 A | * | 4/1996 | Majima et al. | ................ 439/78 |
| 5,562,477 A | * | 10/1996 | Moore et al. | ................ 439/383 |
| 6,065,992 A | * | 5/2000 | Wu et al. | ................ 439/383 |
| 6,814,463 B2 | * | 11/2004 | Mele | ........................... 362/184 |
| 2002/0064973 A1 | | 5/2002 | Nakamura et al. | |

FOREIGN PATENT DOCUMENTS

| | | |
|---|---|---|
| JP | 04-039995 | 2/1992 |
| JP | 04-263186 | 9/1992 |
| JP | 10-240420 | 9/1998 |
| JP | 11-330723 | 11/1999 |
| JP | 2002-110287 | 4/2002 |

\* cited by examiner

*Primary Examiner*—Phuong Dinh
(74) *Attorney, Agent, or Firm*—Greer, Burns & Crain, Ltd.

(57) ABSTRACT

A tablet PC has a body including a printed circuit board, a battery and pen holder. A first connector is fixed to the printed circuit board, and a second connector is fixed to the battery. The second connector is engageable with the first connector when the battery is mounted on the body. A stopper is provided on the printed circuit board to regulate the position of the battery when the battery is mounted on the body. The body has a battery-accommodating portion having an end wall having an opening. The first connector is exposed from that opening.

16 Claims, 19 Drawing Sheets

INFORMATION PROCESSING APPARATUS HAVING BATTERY AND PRINTED CIRCUIT BOARD

BACKGROUND OF THE INVENTION

1. Field of the Invention

The present invention relates to an information processing apparatus and a printed circuit board.

2. Description of the Related Art

A tablet PC as an information processing apparatus, has been developed. The tablet PC is a flat plate-like rectangular personal computer to which data can be input with a pen. A battery is mounted in one side of the body of the tablet PC. The body of the tablet PC includes a printed circuit board, and a first connector is fixed to the printed circuit board. A second connector provided on the battery is engageable with the first connector of the printed circuit board. Also, a stopper is provided to regulate the position of the battery when the battery is mounted on the body of the tablet PC.

Terminals of the first connector are connected to terminals of the printed circuit board by soldering. When the battery is mounted on the body of the tablet PC, the battery is pushed toward the body of the tablet PC. The second connector is pushed toward the first connector, and the second connector is finally fitted in/on the first connector. However, when the second connector is pushed toward the first connector, the second connector is fitted in/on the first connector, and the second connector impinges against the first connector, so that the first connector is subjected to a shock given by the second connector. In particular, the battery is heavy, and a strong force is applied when it is inserted, so that the second connector attached to the battery is likely to apply excessive force to the first connector. If the first connector is subjected to a shock, the solder connection between the terminals of the first connector and the terminals of the printed circuit board are subjected to an undesirable force and a problem, that the solder connection is impaired, may occur.

Conventionally, a stopper is provided on the body of the tablet PC so that the battery abuts against the stopper when the battery is inserted in the body of the tablet PC, to thereby prevent the second connector from applying a shock to the first connector, to thereby prevent the solder connection between the terminals of the first connector and the terminals of the printed circuit board from being impaired. However, the stopper must be so accurately disposed that the battery abuts against the stopper at a position at which the second connector is reliably fitted in/on the first connector. Therefore, it is necessary to set the positional relationship between the stopper and the first connector with high precision, and to set the positional relationship between the printed circuit board and the body of the tablet PC with high precision. Therefore, assembling of the tablet PC becomes difficult and the manufacturing cost is increased.

SUMMARY OF THE INVENTION

The object of the present invention is to provide an information processing apparatus including a battery, and a printed circuit board, in which assembling work is facilitated and the manufacturing cost can be reduced.

An information processing apparatus according to the present invention comprises a body including a printed circuit board, a battery coupled with the body, a first connector fixed to the printed circuit board, a second connector fixed to the battery and engageable with the first connector, and a stopper regulating the position of the battery when the battery is mounted on the body, the stopper being disposed on the printed circuit board.

In this configuration, when the battery is mounted on the body of the tablet PC, the second connector is fitted in/on the first connector, and the battery abuts against the stopper provided on the printed circuit board, whereby the position of the battery is regulated. Therefore, the second connector does not apply a shock to the first connector. Since the first connector and the stopper are disposed on the printed circuit board, it is possible to easily and reliably set the positional relationship between the first connector and the stopper. Therefore, it is possible to provide an information processing apparatus having a battery, in which assembling work is facilitated and the manufacturing cost can be reduced.

A tablet PC according to the present invention comprises a body including a printed circuit board, a battery coupled with the body, a pen holder arranged in the body, a first connector fixed to the printed circuit board, a second connector fixed to the battery and engageable with the first connector, and a stopper regulating the position of the battery when the battery is mounted on the body, the stopper being disposed on the printed circuit board.

In this case too, it is possible to provide a tablet PC, having a battery, in which assembling work is facilitated and the manufacturing cost can be reduced.

Also, the present invention provides a printed circuit board, arranged in a body, comprising a connector and a stopper regulating the position of the battery when the battery is coupled with the body.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

The preferred embodiments of the present invention, in which an information processing apparatus is applied to a tablet PC, are described below with reference to the drawings.

Figure 1:
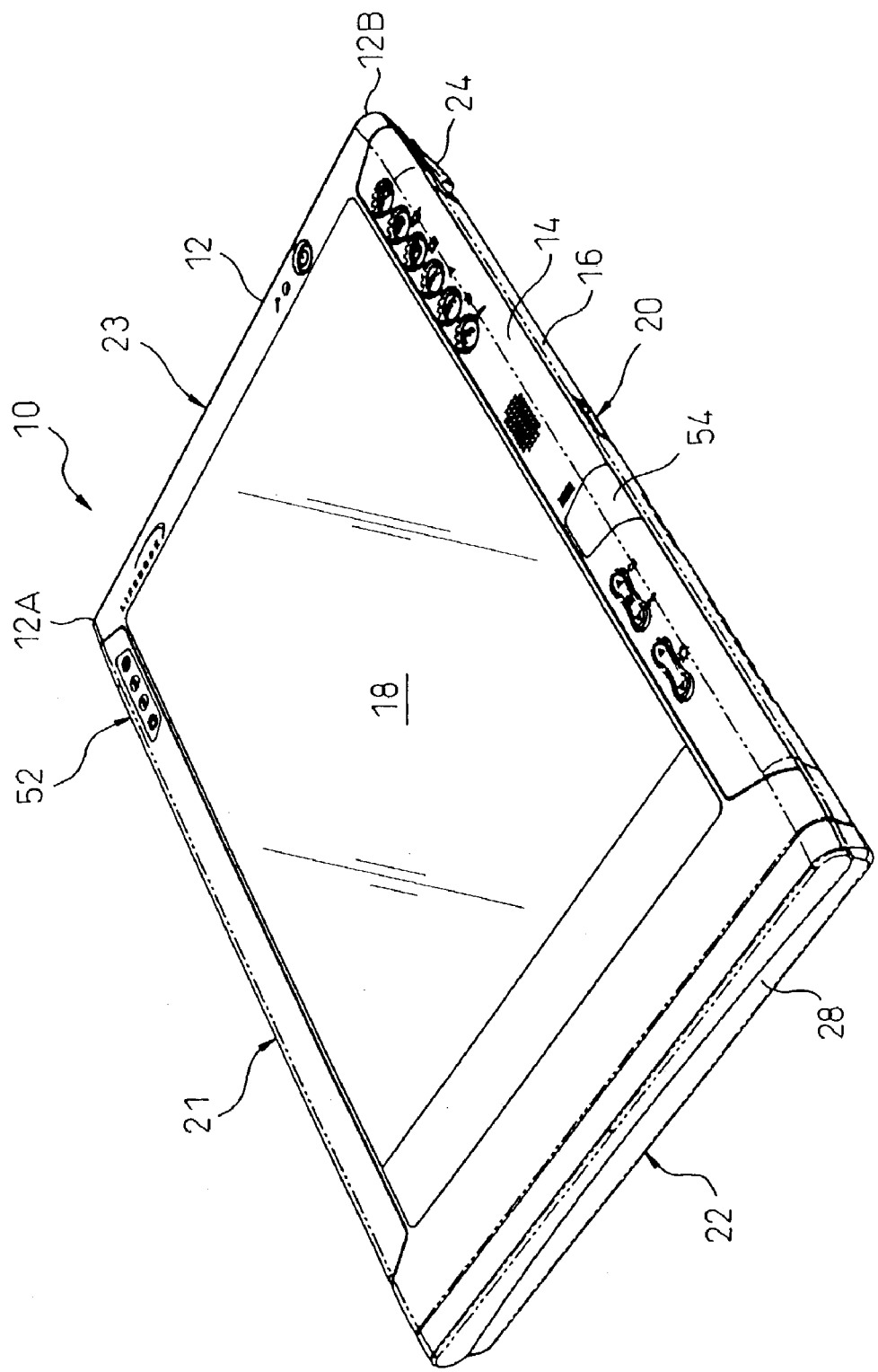
FIG. 1 is a perspective view of a tablet PC according to an embodiment of the present invention.
Figure 2:
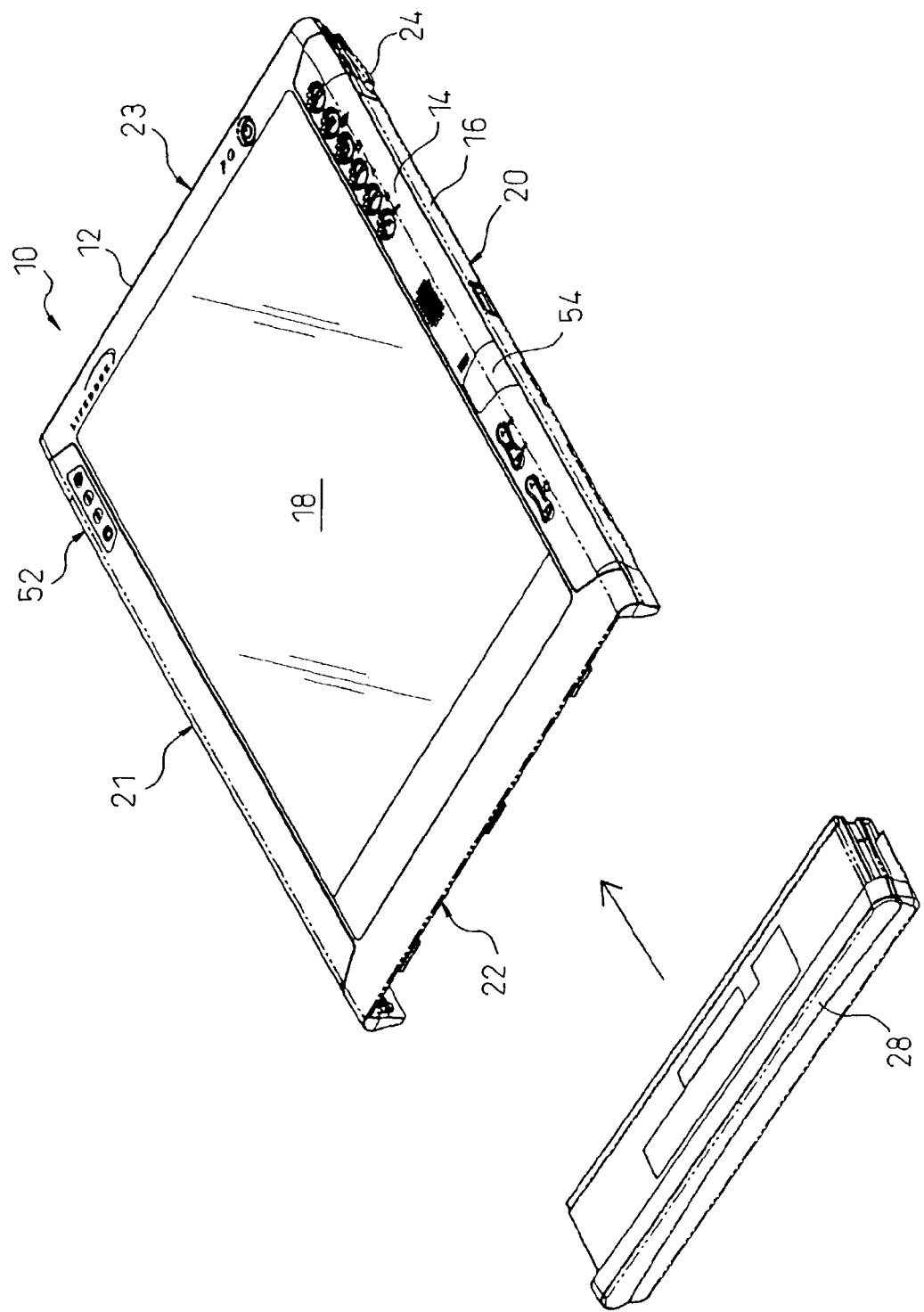
FIG. 2 is a perspective view of the tablet PC of FIG. 1, in the state in which the battery is removed from the body.
Figure 3:
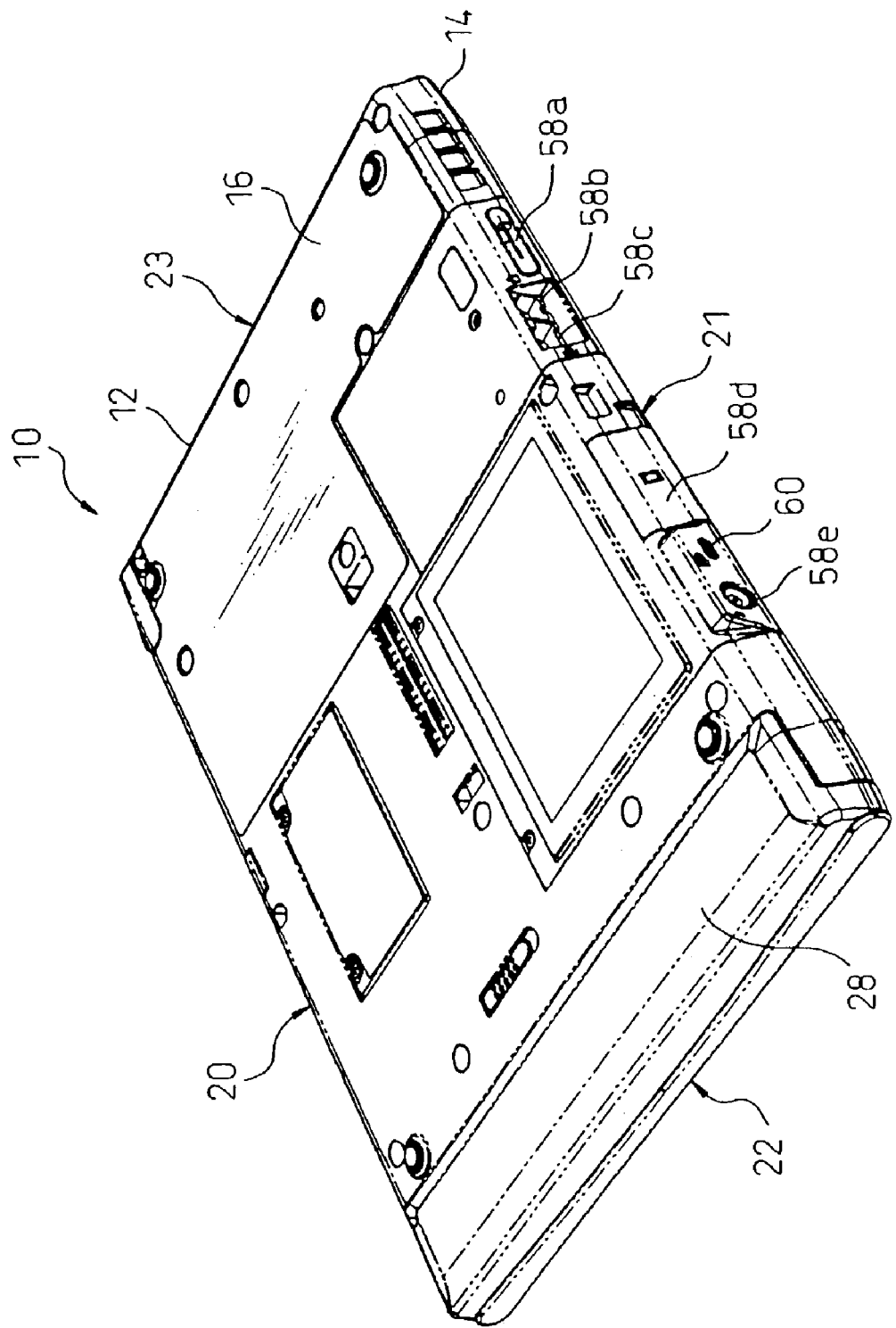
FIG. 3 is a perspective bottom view of the tablet PC of FIG. 1, seen from the bottom.
Figure 4:
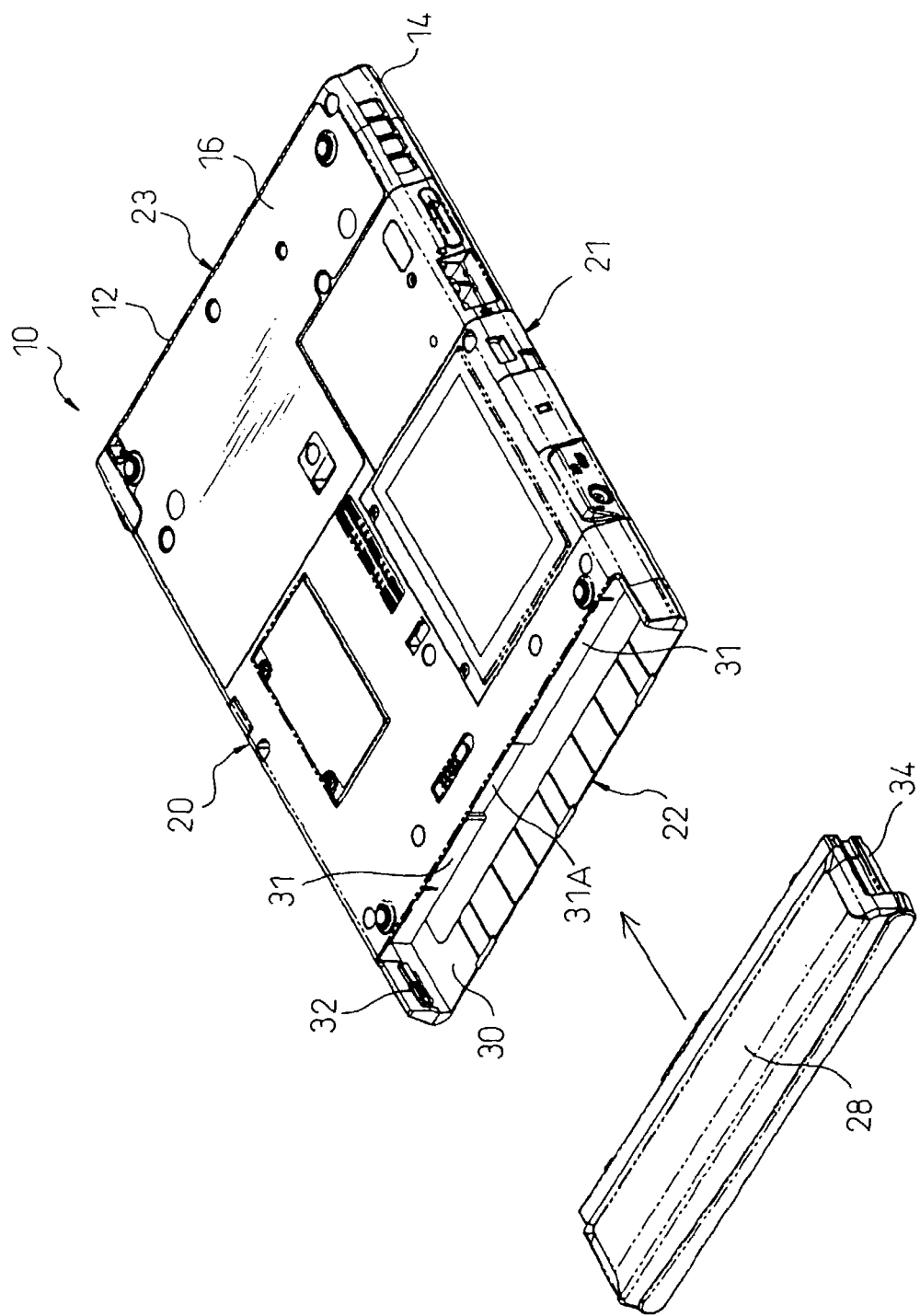
FIG. 4 is a perspective bottom view of the tablet PC of FIG. 3, in the state in which the battery is removed from the body.

FIG. 1 is a perspective view of a tablet PC of an embodiment of the present invention, and FIG. 2 is a perspective view of the tablet PC of FIG. 1, in the state in which the battery is removed from the body. FIG. 3 is a perspective bottom view of the tablet PC of FIG. 1, seen from the bottom, and FIG. 4 is a perspective bottom view of the tablet PC of FIG. 3, in the state in which the battery is removed from the body.

The tablet PC 10 shown in FIGS. 1 to 4 has a flat plate-like rectangular body 12. The body 12 comprises a lower cover 16 and an upper cover 14 covering the lower cover 16. A display portion 18 is provided in the surface of the body 12. Electronic components (not shown in the drawings) and a printed circuit board are disposed in the body 12. The body 12 has a first long side portion 20 and a second long side portion 21 opposed to each other, and a first short side portion 22 and a second short side portion 23 opposed to each other.

Figure 8:
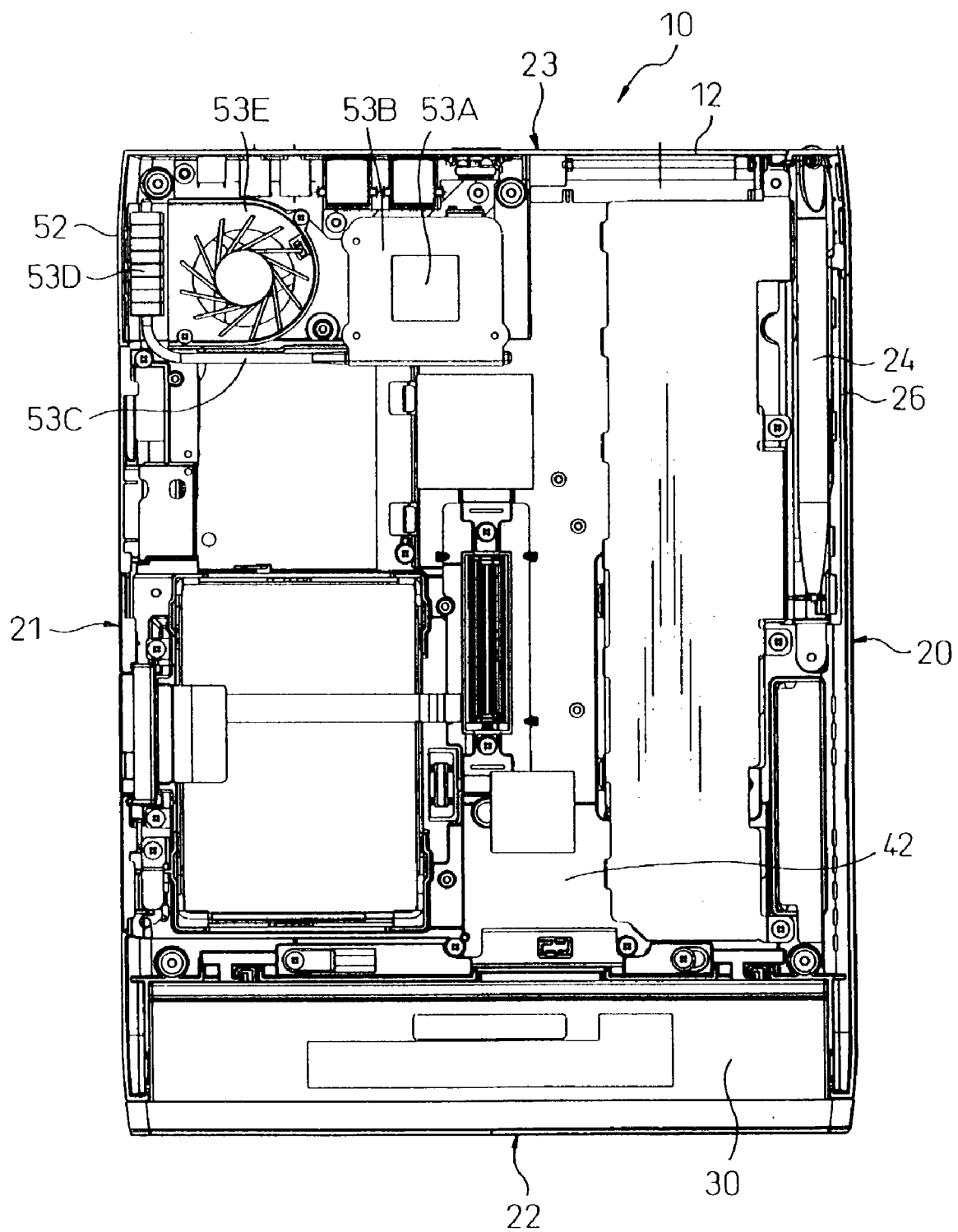
FIG. 8 is a plan view showing the interior of the tablet PC.

The tablet PC 10 is a personal computer into which information can be input with a pen 24. FIG. 8 is a plan view showing the interior of the tablet PC. The pen 24 is accommodated in a penholder 26 provided along the first long side portion 20. The penholder 26 is a substantially cylindrically shaped container which opens toward the second short side portion 23, and extends downward from the upper end of the first long side portion 20 to the middle part of the first long side portion 20. The pen 24 is taken out from the penholder 26 when it is used. For example, the pen 24 has a coil and the body 12 has an antenna. Data can be input with the pen 24 through the interaction between the coil and the antenna. Data can be input to the tablet PC 10 by clicking the pen 24 toward the display portion 18 or allowing the pen 24 to make contact with the display portion 18.

A battery 28 is disposed at the first short side portion 22 of the body 12 so as to overlap with the upper cover 14. As shown in FIG. 4, a battery-accommodating portion 30 is provided at the first short side portion 22 of the body 12, and the battery 28 is inserted in the battery-accommodating portion 30 of the first short portion 22 of the body 12 as shown by the arrow.

The battery-accommodating portion 30 has an end wall 31 having an opening 31A. The bottom wall of the lower cover 16 terminates at the end wall 31 of the battery-accommodating portion 30, and the upper cover 14 extends beyond the end wall 31 of the battery-accommodating portion 30. Thus, in the state that the battery 28 is attached to the body 12, the battery 28 overlaps with the upper cover 14 but is substantially exposed from the bottom wall of the lower cover 16. The width of the battery 28 is nearly equal to that of the body 12.

For example, supposing that the battery 28 is disposed in the body 12, the battery 28 may be arranged to overlap with electronic components in the body and, thereby, the total thickness and the weight of the body increases accordingly. On the other hand, by arranging the battery 28 at the first short side portion 22 of the body 12, the battery 28 can be disposed on the extension line of electronic components in the body so that it does not overlap with the electronic components, and thereby the thickness of the body can be reduced to a value nearly equal to the thickness of the battery 28 and the weight of the body can be reduced accordingly. Also, by arranging the battery 28 to overlap with the upper cover 14, the strength of the portion around the battery 28 may be increased, compared with the case where the battery 28 is simply disposed at the side of the body 12.

Figure 5:
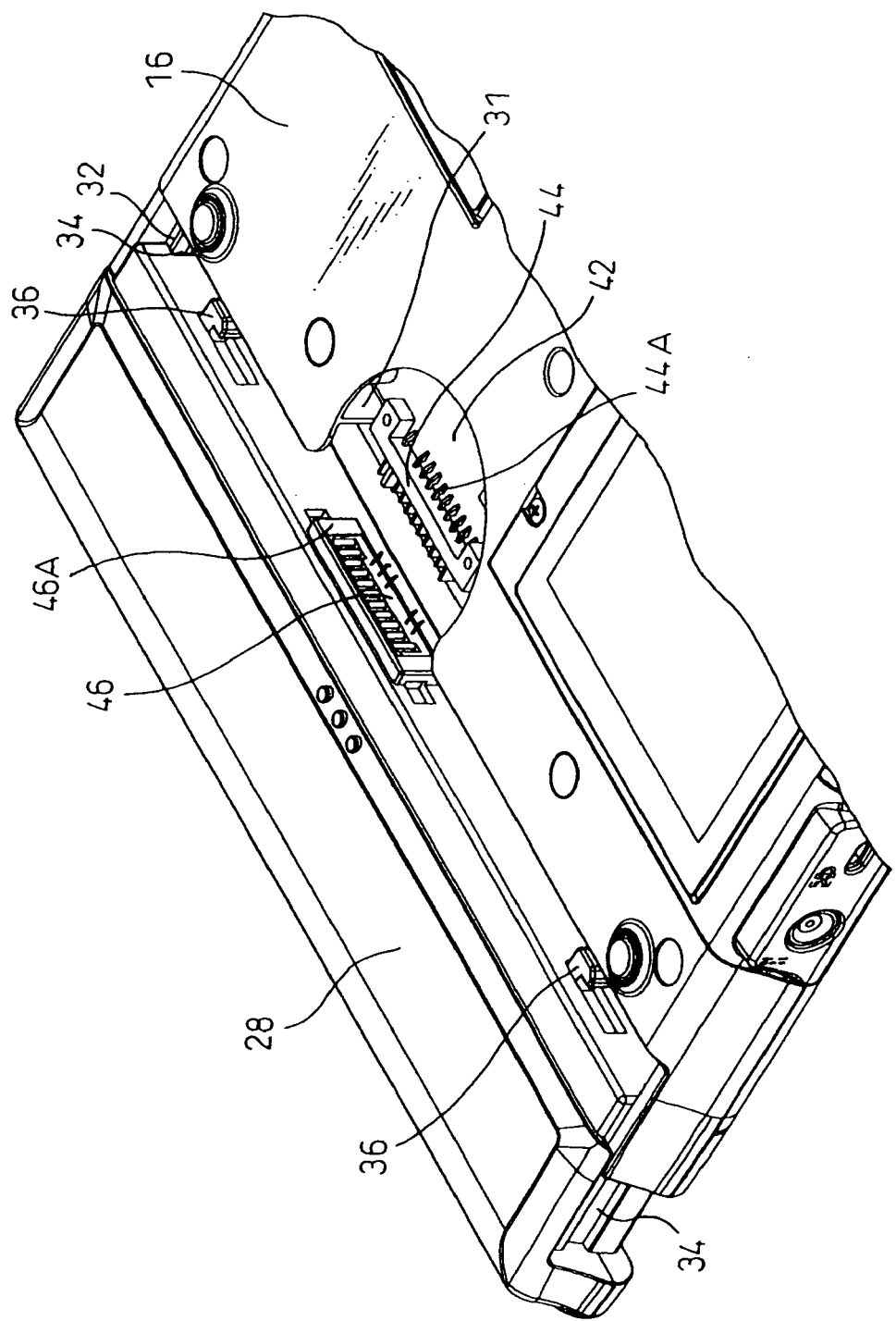
FIG. 5 is a perspective bottom view of the tablet PC of FIG. 5, in the state in which the battery is being attached to the body.

FIG. 5 is a perspective bottom view of the tablet PC of FIG. 4, in the state in which the battery 28 is being attached to the body. In FIG. 5, part of the lower cover 16 is cut away to show a printed circuit board 42 in the body 12. As shown in FIGS. 4 and 5, the side walls of the battery-accommodating portion 30 of the body 12 have guides 32, and the sides of the battery 28 have guide slots 34. Thus, the battery 28 can be inserted in the battery-accommodating portion 30 by the sliding engagement of the guide slots 34 with the guides 32.

Figure 6A:
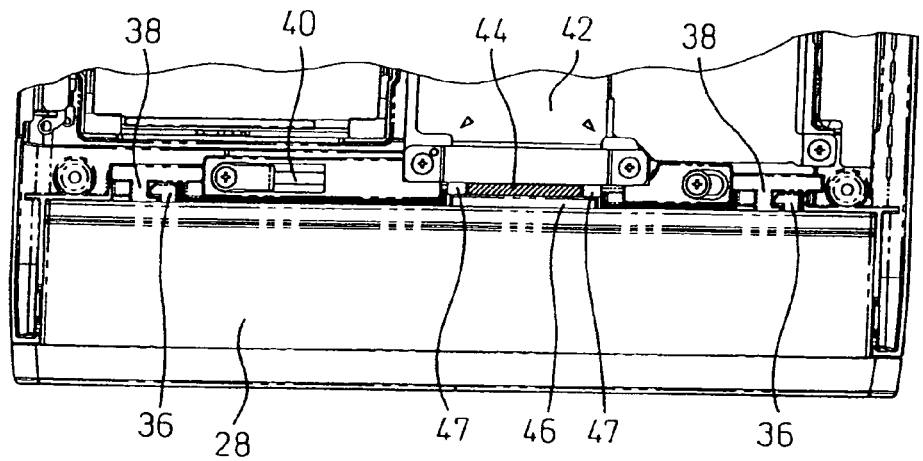
FIG. 6A is a bottom view of the tablet PC of FIG. 5, with the battery accommodated in the battery-accommodating portion.

The battery 28 has lock claws 36 at its front end, and the end wall 31 of the battery-accommodating portion 30 has lock claws 38 as shown in FIG. 6A. The lock claws 38 are biased by springs 40. When the battery 28 is inserted in the battery-accommodating portion 30, the lock claws 36 move behind the lock claws 38 while pushing the lock claws 38 transversely, and then the lock claws 38 are pushed back by the springs 40 to engage with the lock claws 36, and the battery 28 is thus locked in the body 12.

Figure 6B:
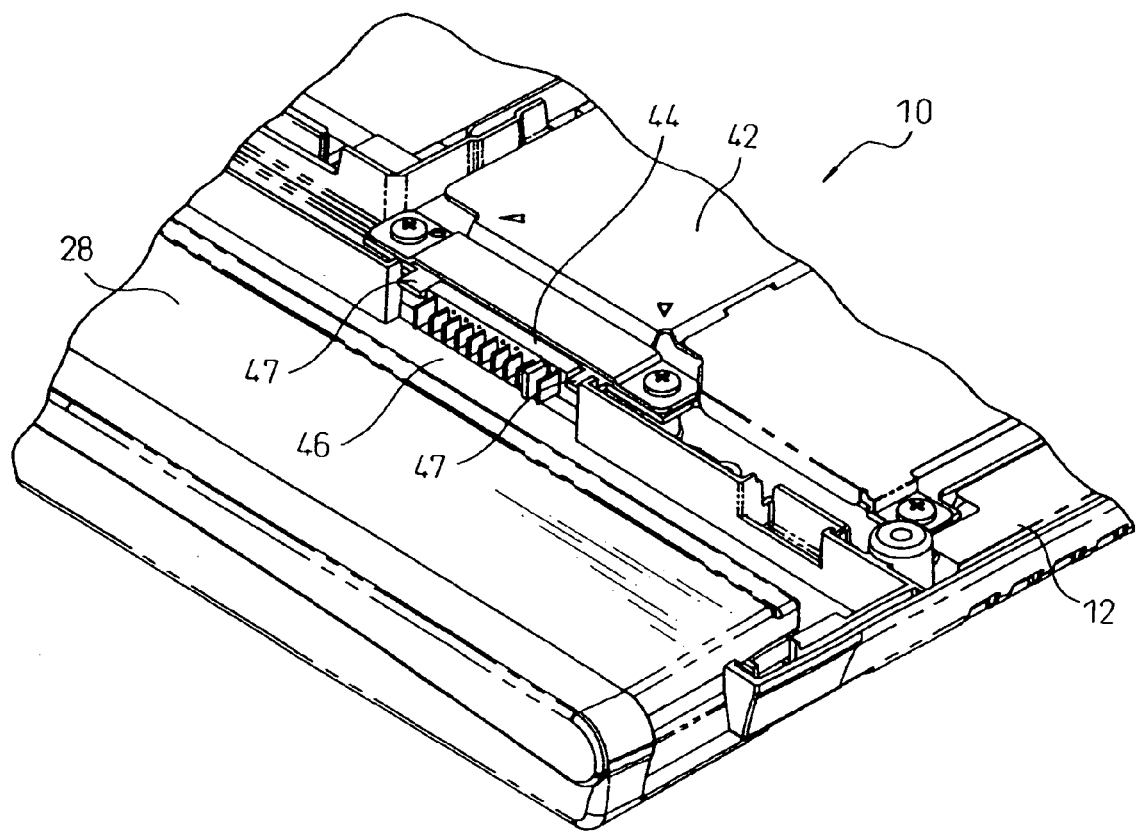
FIG. 6B is a perspective view of the tablet PC of FIG. 5 with the battery accommodated in the battery-accommodating portion.

FIG. 6A is a bottom view of the tablet PC of FIG. 5, in the state in which the battery 28 is accommodated in the battery-accommodating portion 30. FIG. 6B is a perspective view of the tablet PC of FIG. 6A. In FIGS. 6A and 6B, the lower cover 16 is removed from the tablet PC. As shown in FIGS. 5, 6A and 6B, the printed circuit board 42 is disposed in the body 12 to extend to the vicinity of the end wall 31 of the battery-accommodating portion 30. A first connector 44 is fixed to the printed circuit board 42. The first connector 44 is exposed to the battery-accommodating portion 30 from the opening 31A of the end wall 31.

The battery has a second connector 46 at its front end, and when the battery 28 is inserted into the battery-accommodating portion 30, the second connector 46 engages with the first connector 44. The first connector 44 has pin-type or hole-type contacts, a connector case surrounding the contacts and terminals 44A which are connected to the printed circuit board 42 by soldering. In FIGS. 6A and 6B, the lock claws 38 are engaged with the lock claws 36, and the second connector 46 is engaged with the first connector 44.

Figure 7:
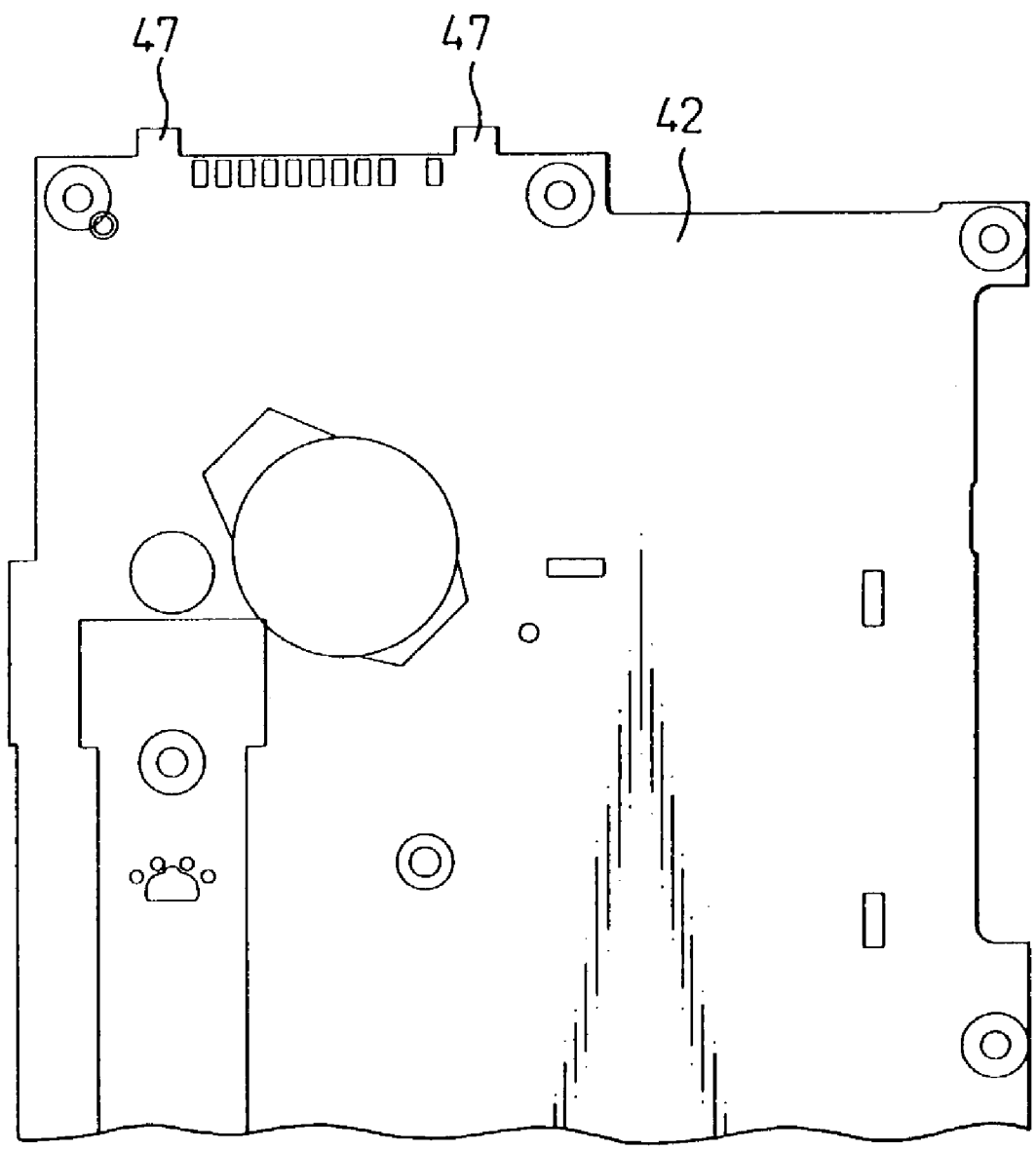
FIG. 7 is a plan view showing the printed circuit board of FIGS. 6A and 6B.

FIG. 7 is a partial plan view showing the printed circuit board 42. In FIGS. 6A to 7, stoppers 47 are formed at the end of the printed circuit board 42 in the form of projections, and the first connector 44 is disposed between two stoppers 47. Stoppers 47 regulate the position of the battery 28 when the battery 28 is mounted on the body 12. The second connector 46 has pin-type or hole-type contacts and a connector case 46A surrounding the contacts, and the stoppers 47 are formed so as to abut against the connector case 46A of the second connector 46.

When the battery 28 is mounted on the body 12 of the tablet PC 10, the second connector 46 is fitted on the first connector 44 and the battery 28 (the connector case 46A of the second connector 46 attached to the battery 28) abuts against the stoppers 47, with the result that the position of the battery 28 is regulated. Therefore, the second connector 46 does not apply a shock to the first connector 44 immediately after the second connector 46 is fitted on the first connector 44. As the first connector 44 and the stoppers 47 are disposed on the printed circuit board 42, it is possible to easily and reliably set the positional relationship between the first connector 44 and the stoppers 47. Also, even if there is an error in the mounting position between the printed circuit board 42 and the body 12, the positional relationship between the first connector 44 and the stoppers 47 does not change. Therefore, it is possible to provide an information processing apparatus having a battery, in which assembling work is facilitated and the manufacturing cost can be reduced.

Figure 9:
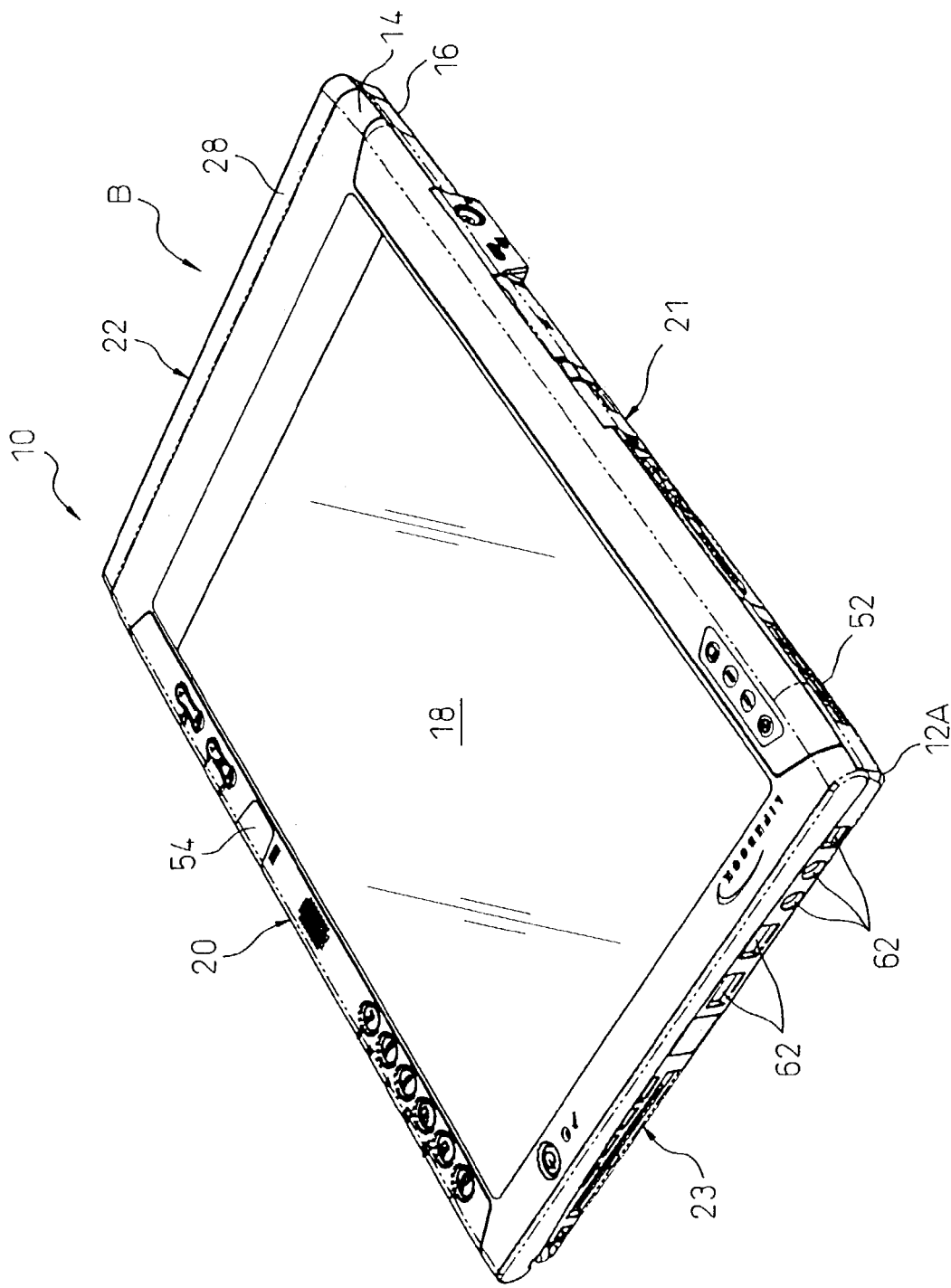
FIG. 9 is a perspective view of the tablet PC, seen from the corner portion between the second short side portion and the second long side portion of FIG. 1.

FIG. 9 is a perspective view of the tablet PC, seen from the corner portion 12A between the second short portion 23 and the second long side portion 21 of FIG. 1. An air outlet opening 52 is disposed at or near the corner portion 12A between the second short portion 23 and the second long side portion 21 of the body 12. That is, the air outlet opening 52 is disposed near the corner portion 12A between the second short side portion 23 opposed to the first short side portion 22 at which the battery 28 is disposed and the second long side portion 21 opposed to the first long side portion 20 at which the pen 24 is disposed. In this embodiment, the air outlet opening 52 is a lattice shaped opening disposed near the corner portion 12A.

FIG. 8 shows a heat sink and a fan disposed in the body. A CPU 53A is disposed in the body 12. The CPU 53A generates heat when it is used. A heat sink 53B is disposed in contact with the CPU 53A, and a heat pipe 53C is so disposed that one end of it is in contact with the heat sink 53b. Fins 53D are disposed at the other end of the curved heat pipe 53C, and a fan 53E is disposed so as to deliver cooling air in parallel with the fins 53D. The fan 53E produce a flow of cooling air toward the air outlet opening 52.

As shown in FIGS. 1 and 9, a receiving means 54, for radio communication, is disposed at the middle part of the first long side portion 20. The receiving means 54, for radio communication is provided at a position with a short distance from the tip of the penholder 26 accommodating the pen 24 toward the first short side portion 22 and with a some distance from the first short side portion 22. The receiving means 54 for radio communication is designed to receive a radio signal transmitted from a keyboard or a mouse. In this embodiment, the keyboard and the mouse transmit an infrared light signal, and the receiving means 54 includes an infrared light receiving element 54a.

Figure 10:
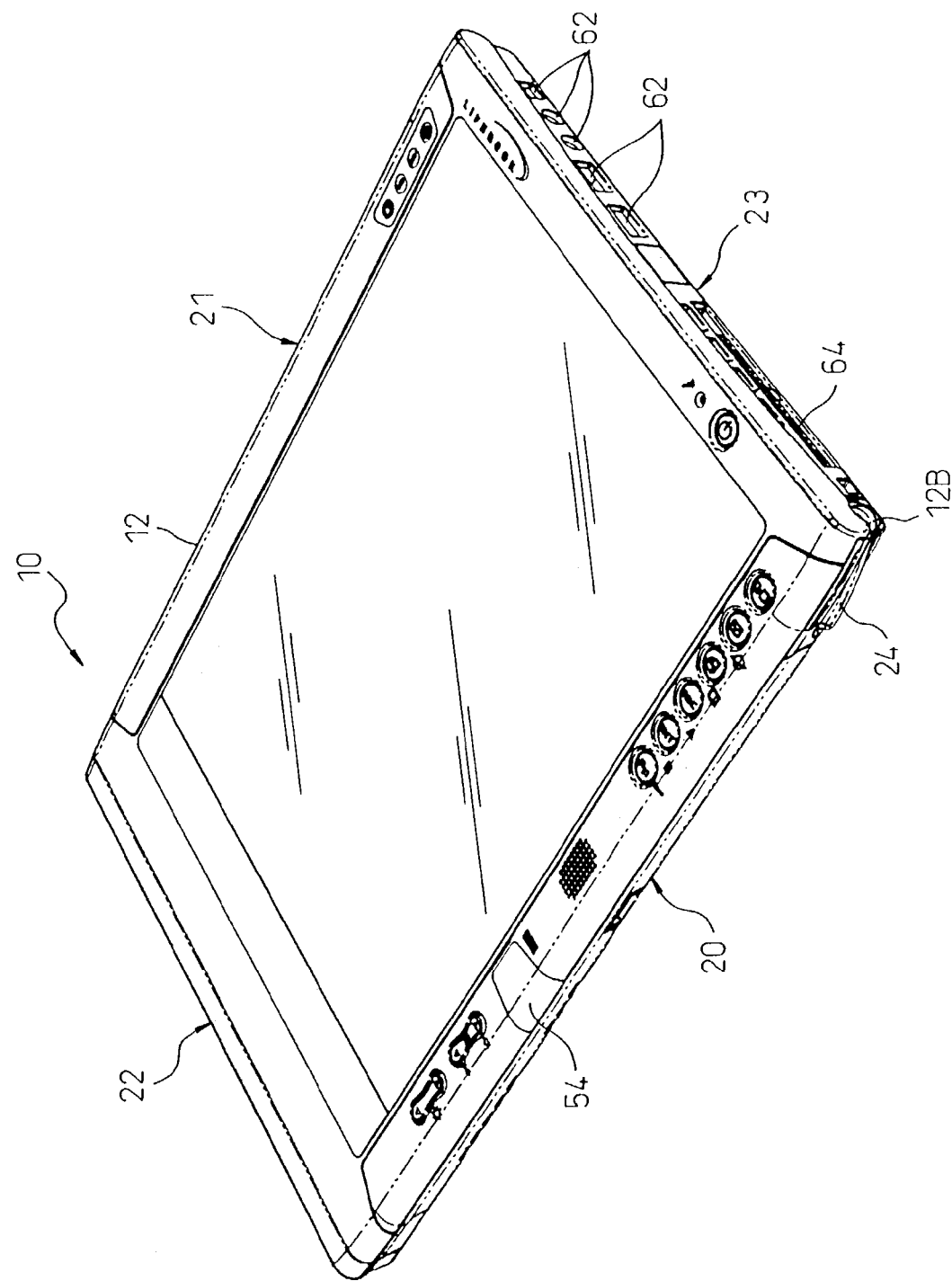
FIG. 10 is a perspective view of the tablet PC, seen from the corner portion between the first long side portion and the second short side portion of FIG. 1.

FIG. 10 is a perspective view of the tablet PC, seen from the corner portion 12B between the first long side portion 20 and the second short side portion 23 of FIG. 1. The pen 24 is disposed at the first long side portion 20.

Figure 11:
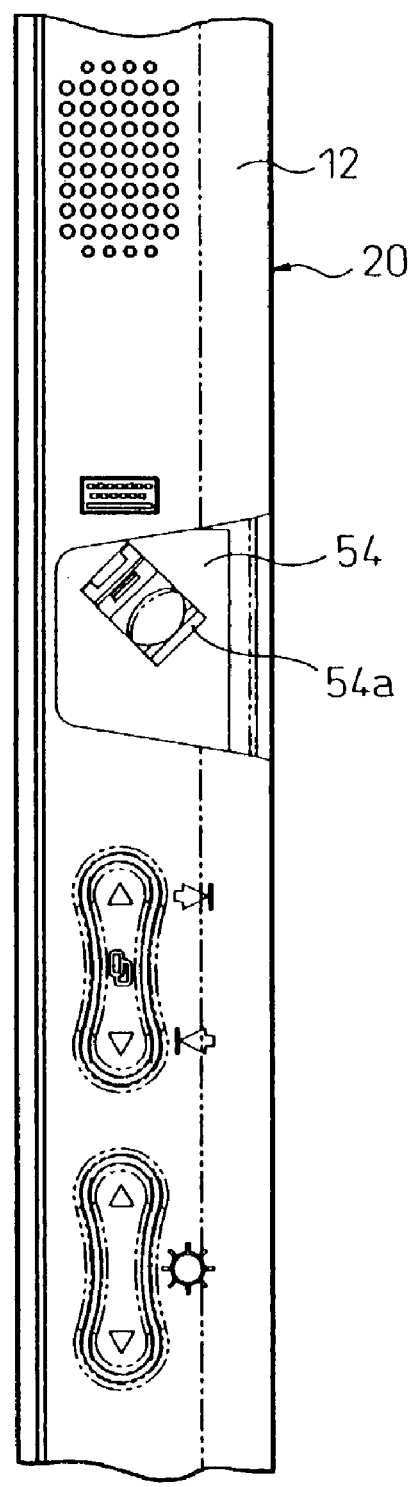
FIG. 11 is a partially enlarged plan view showing the first long side portion of the body having the infrared light receiving element.
Figure 12:
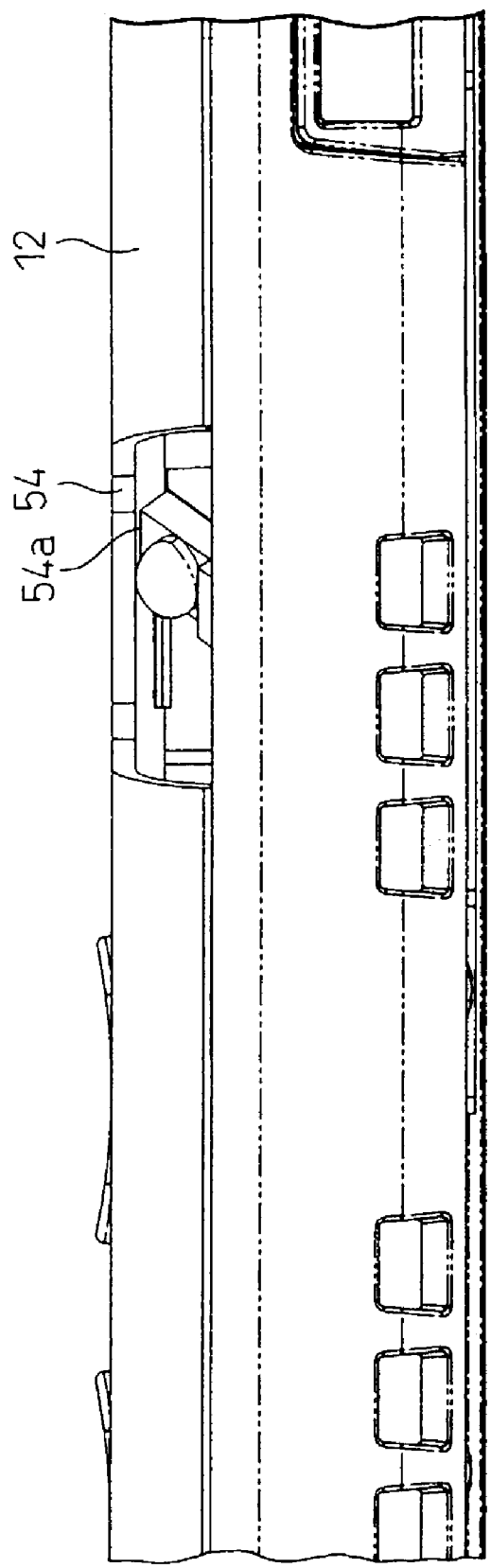
FIG. 12 is a partially enlarged side view showing the first long side portion of the body having the infrared light receiving element.

FIG. 11 is a partially enlarged plan view showing the first long side portion 20 of the body 12 having the infrared light receiving element 54a, and FIG. 12 is a partially enlarged side view showing the first long side portion 20 of the body 12 having the infrared light receiving element 54a. The infrared light receiving element 54a is disposed at a downward inclination of 45 degrees with respect to the first long side portion 20 of the body 12. In FIGS. 1 and 10, a light permeable cover covering the infrared light receiving element 54a is disposed, but in FIGS. 11 and 12, the light permeable cover is removed.

Figure 13:
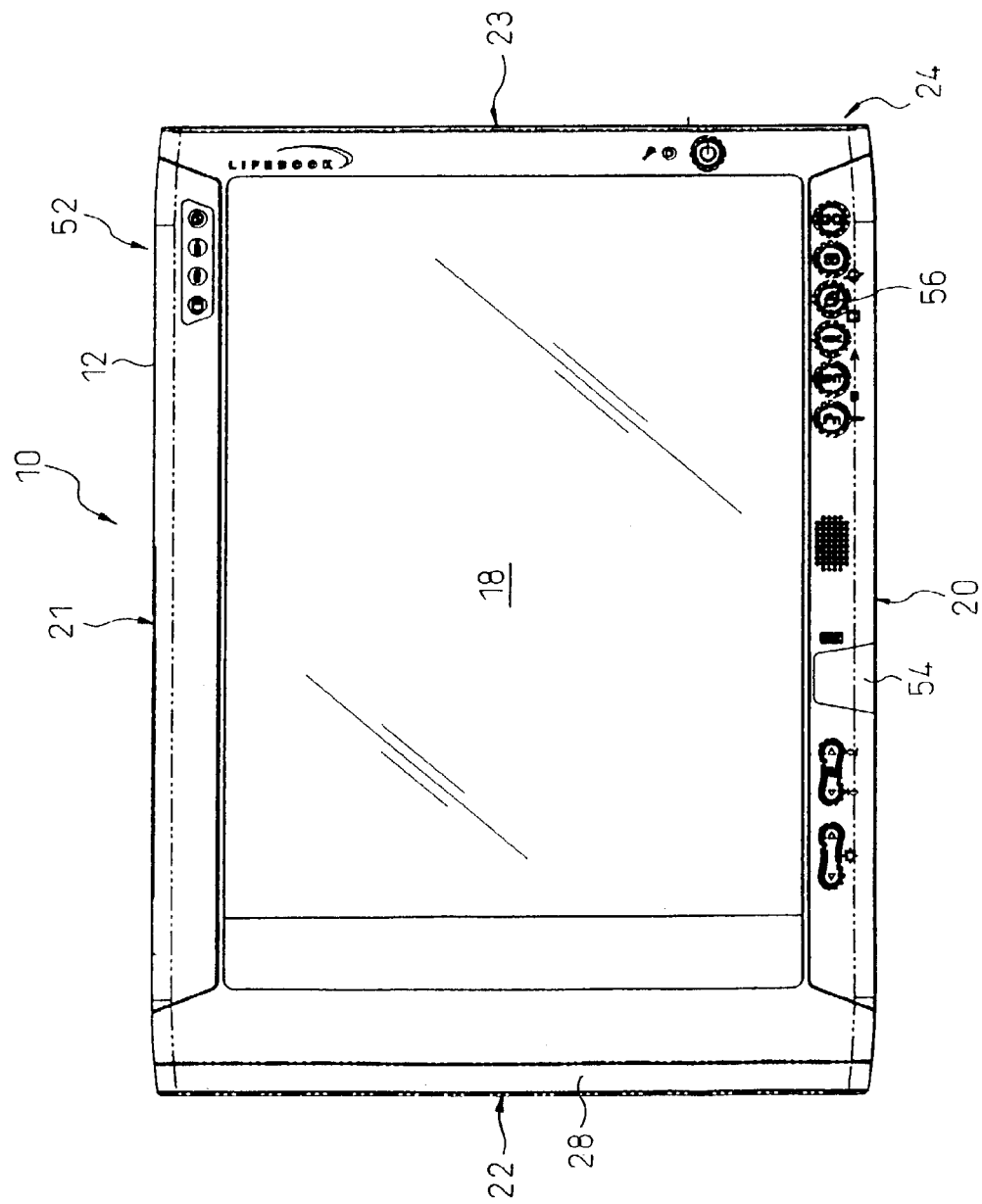
FIG. 13 is a plan view of the tablet PC used in the widthwise position.

FIG. 13 is a plan view of the tablet PC 10 used in the horizontal position. When the tablet PC 10 is used in the horizontal position as shown in FIG. 13, the first long side portion 20 at which the pen 24 is disposed is positioned at the bottom of the tablet PC 10, and the second long side portion 21 is positioned at the top of the tablet PC 10. In this-case, the screen of the display portion 18 is horizontally long. Data input operation can be performed with the pen 24 while holding the first long side portion 20 with a hand. The pen 24 can be taken out easily from the penholder 26 with the right hand. Furthermore, as the air outlet opening 52 is disposed at the second long side portion 21 positioned at the top of the tablet PC 10, heated air flows upward and then flows out of the air outlet opening 52.

Figure 14:
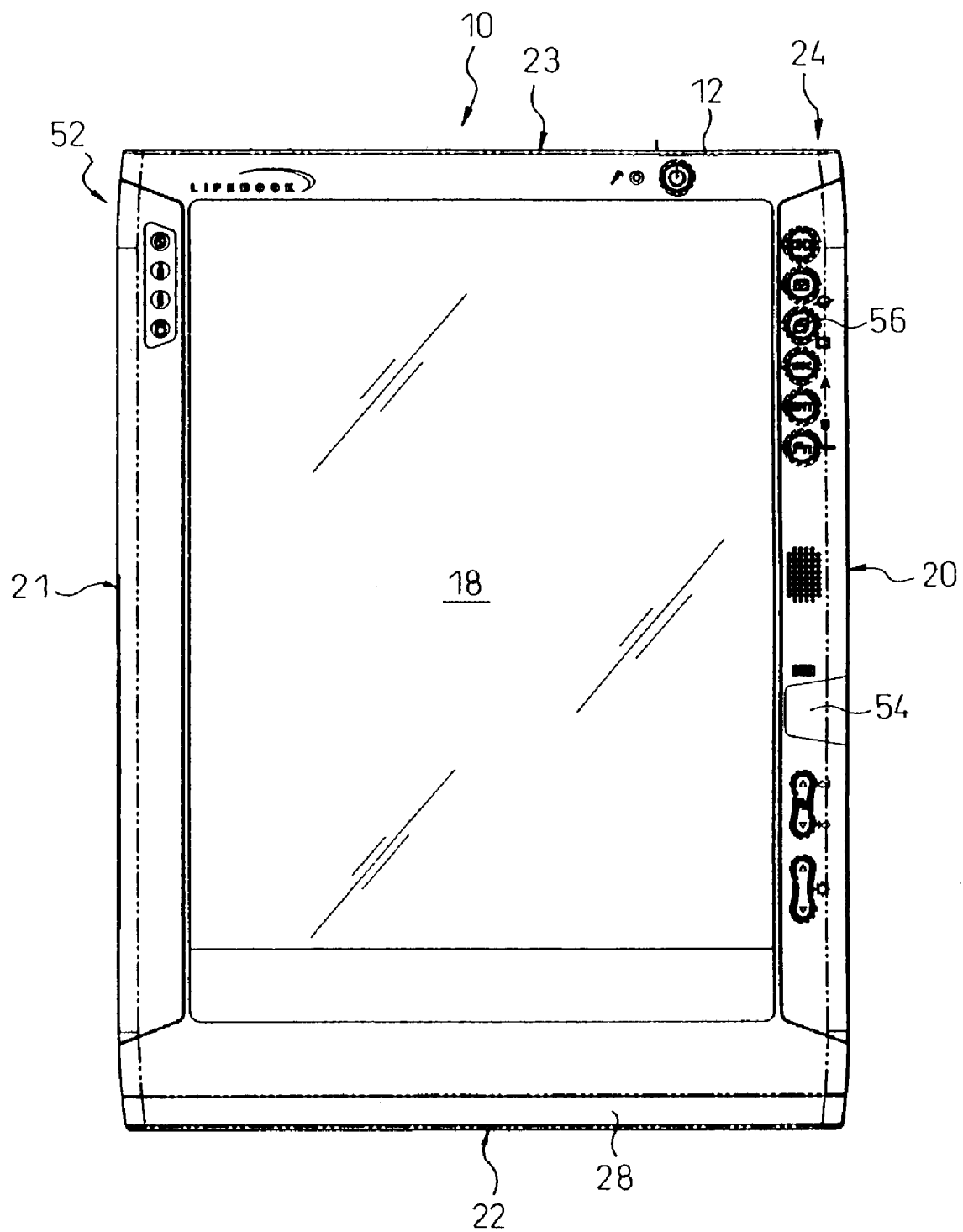
FIG. 14 is a plan view of the tablet PC used in the vertical position.

FIG. 14 is a plan view of the tablet PC 10 used in the vertical position. When the tablet PC 10 is used in the vertical position as shown in FIG. 14, the first short side portion 22 at which the battery 28 is disposed is positioned at the bottom of the tablet PC 10, and the second short side portion 23 is positioned at the top of the tablet PC 10. In this case, the screen of the display portion 18 is vertically long. Data input operation can be performed with the pen 24 while holding the first short side portion 22 with a hand. The pen 24 can also be taken out easily from the penholder 26 with the right hand. Furthermore, as the air outlet opening 52 is disposed near the upper end of the second long side portion 21, heated air flows upward and then flows out of the air outlet opening 52.

As shown in FIGS. 13 and 14, a plurality of operation buttons are arranged on the surface of the body 12. When one of the operation buttons 56 is pushed, a display in the display portion 18 changes between a display suitable for using the tablet PC 10 in the horizontal position and a display suitable for using the tablet PC 10 in the vertical position. Software capable of changing a display in this manner is distributed in the market by, for example, Microsoft Corporation.

The tablet PC 10 further comprises a plurality of I/O connectors. As shown in FIG. 3, many I/O connectors 58 are disposed at the second long side portion 21. For example, a radio communication LAN antenna 58a, a MODEM connector 58b, a LAN connector 58c, a VGA connector 58d, and an AC adapter 58e are disposed at the second long side portion 21. In addition, a keyhole for security 60 is disposed at the second long side portion 21.

Also, as shown in FIGS. 9 and 10, a plurality of I/O connectors 62 are disposed at the second short side portion 23. For example, these I/O connectors 62 include an IEEE 1394 connector, a headphone connector, a microphone connector, an infrared light port, an USB connector, etc. A PC card slot is also disposed at the second short side portion 23. In this way, the battery 28 and the penholder 26 are disposed at two side portions (the first short side portion 22 and the first long side portion 20), respectively, of the four side portions 20, 21, 22, and 23 of the body 12 so that one of the side portions can be held with a hand, and the connectors 58 and the connectors 62 are disposed at two side portions (the second long side portion 21 and the second short side portion 23) respectively so that force is not applied to the connectors 58 and the connectors 62 by a hand.

Figure 15:
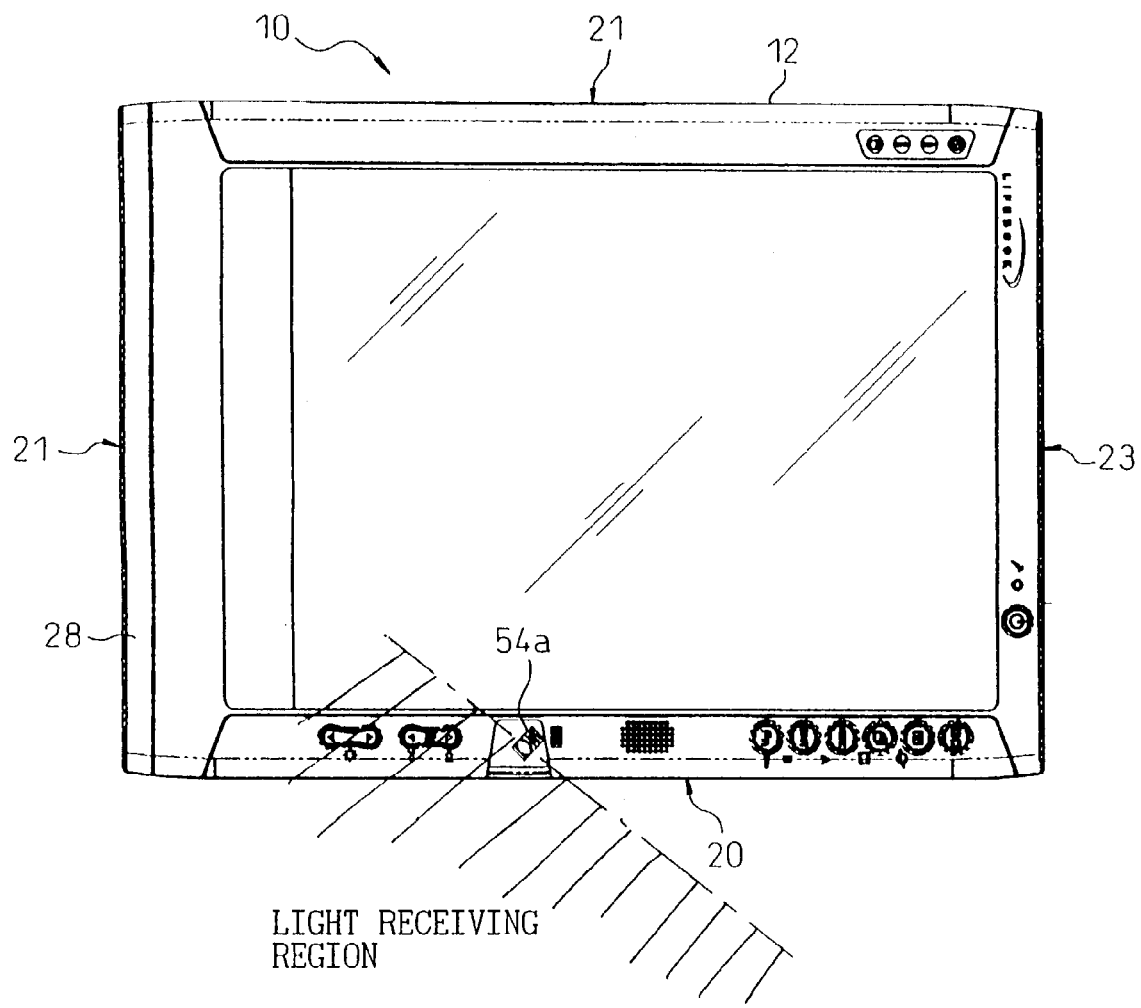
FIG. 15 is a plan view of the tablet PC in the horizontal position like that in FIG. 13, for illustrating the function of the infrared ray receiving element.
Figure 16:
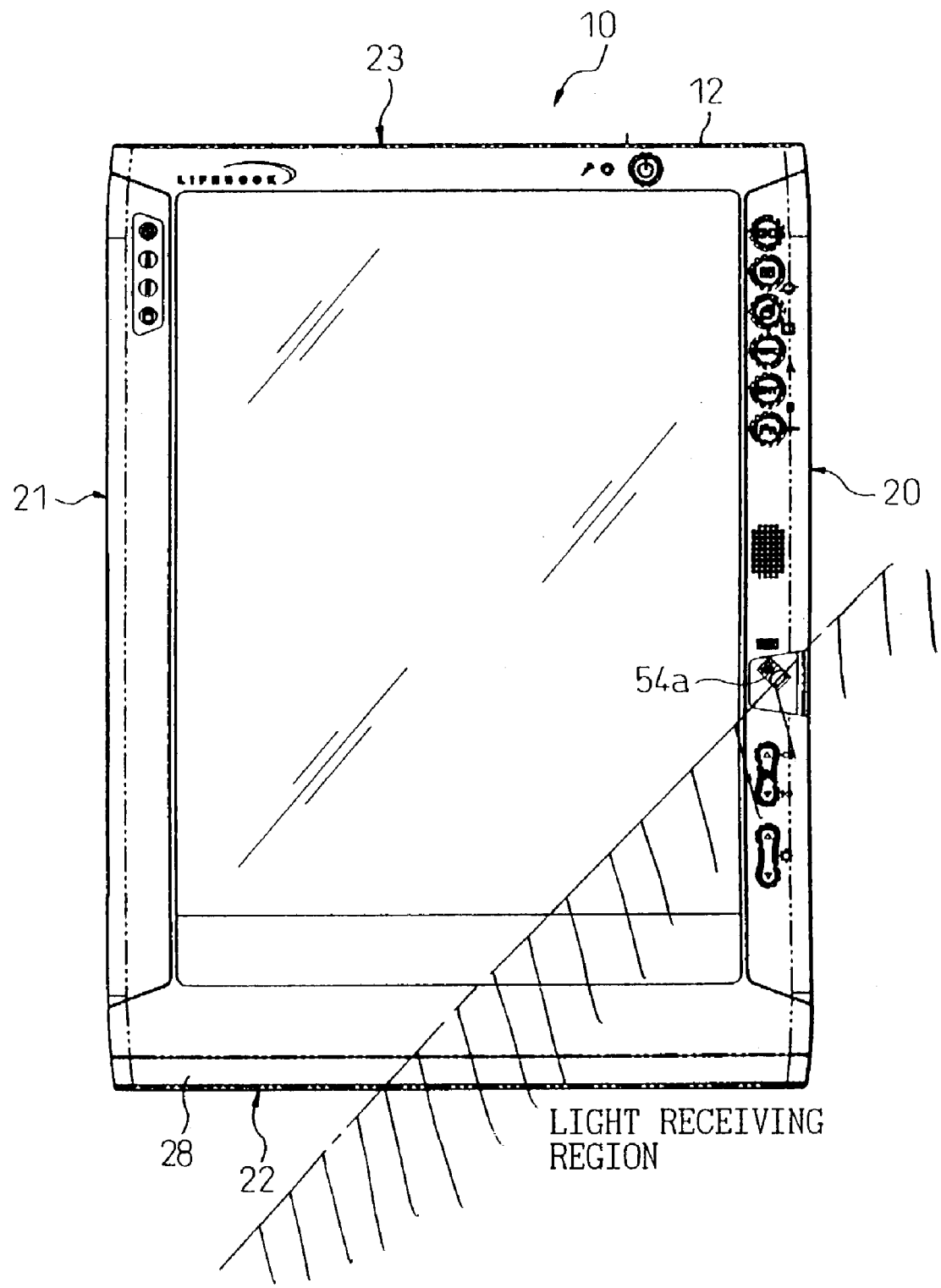
FIG. 16 is a plan view of the tablet PC in the vertical position, like that in FIG. 14, for illustrating the function of the infrared ray receiving element.

FIG. 15 is a plan view of the tablet PC in the horizontal position like that in FIG. 13, for illustrating the function of the infrared light receiving element 54a. FIG. 16 is a plan view of the tablet PC in the vertical position like that in FIG. 14, for illustrating the function of the infrared light receiving element 54a. The infrared light receiving element 54a which is available in the market can detect infrared light made incident from the front of a plane passing through the lens of the infrared light receiving element 54a and normal to the axis of the infrared light receiving element 54a, but can not detect infrared light made incident from the back of that plane.

When the tablet PC is used in the horizontal position as shown in FIG. 15, the infrared light receiving element 54a can receive an infrared light signal transmitted from the hatched area in FIG. 15. When the tablet PC is used in the vertical position as shown in FIG. 16, the infrared light receiving element 54a can receive an infrared light signal transmitted from the hatched area in FIG. 16. In this way, as the infrared light receiving element 54a is disposed near the midpoint of the first long side portion 20 with an inclination at an angle to it, the single infrared light receiving element 54a can receive an infrared light signal from a wide area, and functions effectively if the tablet PC 10 is used in the horizontal position as well as in the vertical position.

Figure 17:
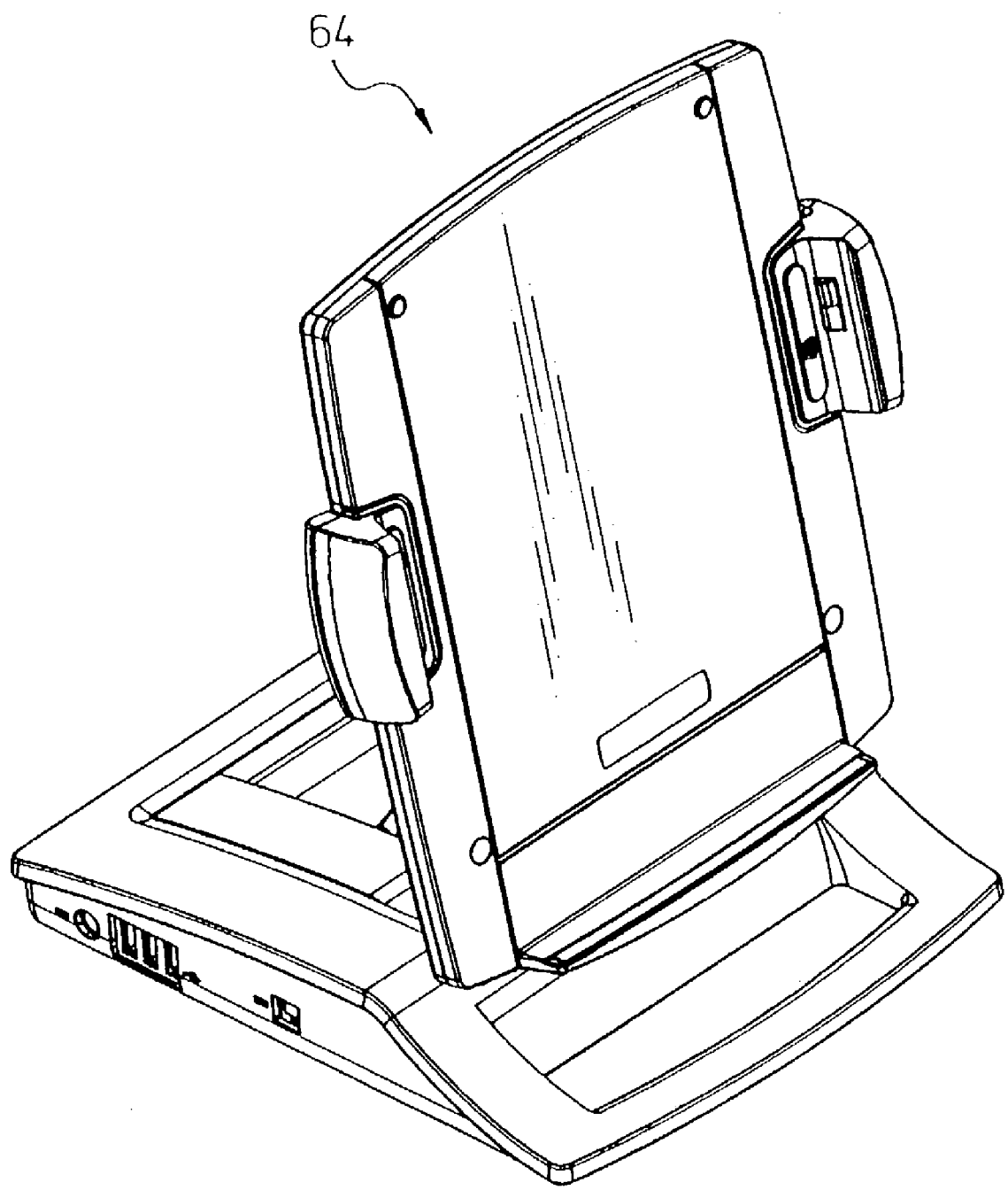
FIG. 17 is a perspective view of the docking unit capable of supporting the tablet PC.
Figure 18:
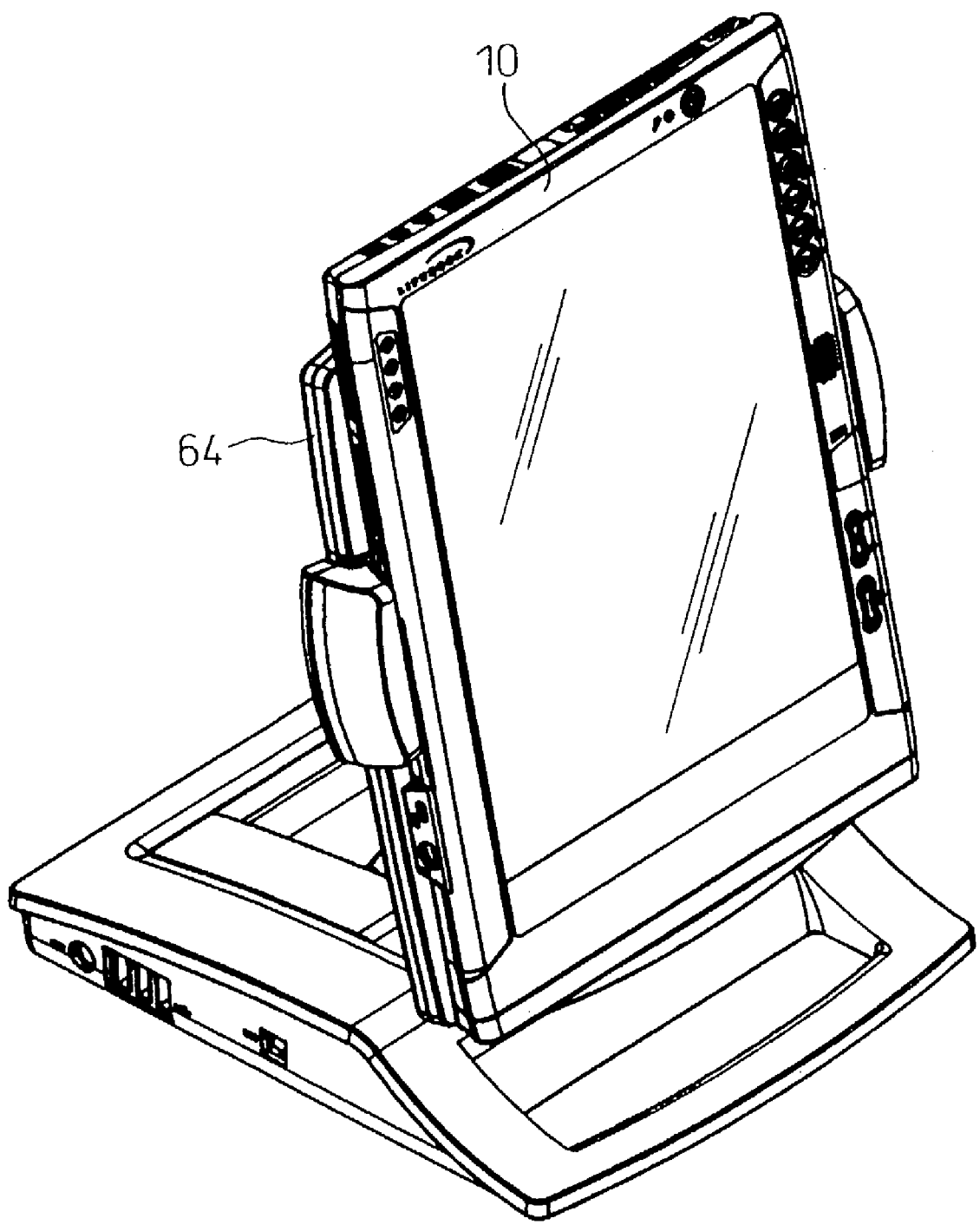
FIG. 18 is a perspective view of the docking unit supporting the tablet PC in the vertical position.
Figure 19:
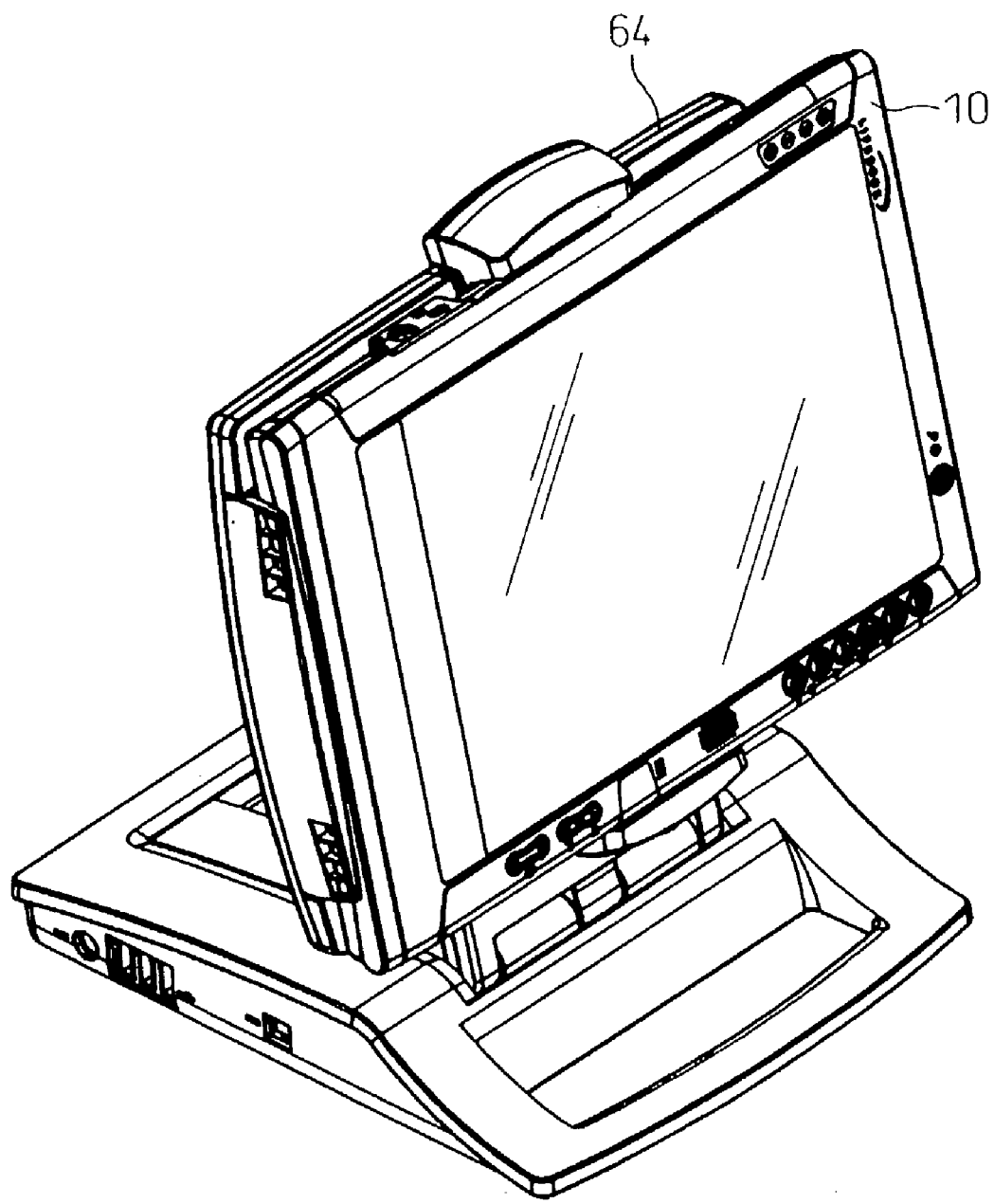
FIG. 19 is a perspective view of the docking unit supporting the tablet PC in the horizontal position.

FIG. 17 is a perspective view of a docking unit 64 capable of supporting the tablet PC 10. FIG. 18 is a perspective view of the docking unit 64 supporting the tablet PC 10 in the vertical position. FIG. 19 is a perspective view of the docking unit 64 supporting the tablet PC 10 in the horizontal position. The tablet PC 10 can be used not only while it is held with a hand but also in the state that it is attached to the docking unit 64 as shown in FIGS. 18 and 19. The tablet PC can be turned on the docking unit 64 to be set in the horizontal position or the vertical position. The docking unit 64 not only supports the tablet PC 10 but also has means to extend the function of the tablet PC 10.

As described above, the present invention provides an information processing apparatus and a tablet PC in which assembling work is facilitated and the manufacturing cost can be reduced.

The invention claimed is:

1. An information processing apparatus comprising:
   a body including a printed circuit board;
   a battery coupled with said body;
   a first connector fixed to said printed circuit board;
   a second connector fixed to said battery and engageable with said first connector; and
   a stopper regulating the position of said battery when said battery is mounted on said body, said stopper being disposed on said printed circuit board and integrally formed with said printed circuit board,
   wherein one of said first connector and said second connector has pin-type contacts, and another of said first connector and said second connector has hole-type contacts configured to engage with said pin-type contacts.

2. The information processing apparatus according to claim 1, wherein said body has a battery-accommodating portion having an end wall at one side of said body, said end wall of said battery-accommodating portion having an opening, said first connector being exposed from said opening.

3. The information processing apparatus according to claim 2, wherein said battery-accommodating portion has a guide and said battery has a guide portion slidingly engageable with said guide, and wherein said battery-accommodating portion has a lock member and said battery has another lock member engageable with said lock member.

4. The information processing apparatus according to claim 1, wherein said second connector has a connector case surrounding contacts and said stopper is formed so as to contact said connector case.

5. An information processing apparatus comprising:
   a body including a printed circuit board;
   a battery coupled with said body;
   a pen holder arranged in said body;
   a first connector fixed to said printed circuit board;
   a second connector fixed to said battery and engageable with said first connection; and
   a stopper regulating the position of said battery when said battery is mounted on said body, said stopper being disposed on said printed circuit board and integrally formed with said printed circuit board,
   wherein one of said first connector and said second connector has pin-type contacts, and another of said first connector and said second connector has hole-type contacts configured to engage with said pin-type contacts.

6. A printed circuit board arranged in a body, comprising:
   a connector; and
   a stopper regulating the position of a battery when the battery is coupled with said body, said connector being engageable with a mating connector provided on the battery, said stopper being disposed on said printed circuit board and integrally formed with said printed circuit board,
   wherein one of said connector and the mating connector has pin-type contacts, and another of said connector and the mating connector has hole-type contacts configured to engage with the pin-type contacts.

7. The information processing apparatus according to claim 1, wherein at least one of said first connector and said second connector includes a connector case surrounding said hole-type or said pin-type contacts.

8. The information processing apparatus according to claim 5, wherein at least one of said first connector and said second connector includes a connector case surrounding said hole-type or said pin-type contacts.

9. The printed circuit board apparatus according to claim 6, wherein at least one of said connector and the mating connector includes a connector case surrounding the hole-type or the pin-type contacts.

10. The information processing apparatus according to claim 1, further comprising a display for displaying information from said information processing apparatus.

11. The information processing apparatus according to claim 5, further comprising a display for displaying information from said information processing apparatus.

12. The printed circuit board according to claim 6, further comprising a display for displaying information.

13. The information processing apparatus according to claim 1, further comprising means for inputting information into said information processing apparatus.

14. The information processing apparatus according to claim 5 further comprising:
   a display for displaying information; and
   a pen for inputting information into said information processing apparatus via contact with said display, said pen being configured to be seated within said pen holder.

15. The printed circuit board according to claim 6, further comprising means for inputting information into said printed circuit board.

16. An information processing apparatus comprising:
- a body including a printed circuit board, a CPU and a display portion;
- a battery coupled with said body, said battery being positioned adjacent an edge of said printed circuit board;
- a first connector fixed to said printed circuit board;
- a second connector fixed to said battery and engageable with said first connector; and
- a pair of stoppers regulating the position of said battery when said battery is mounted on said body, each of said stoppers being comprised of a projection extending outwardly from the edge of said printed circuit board toward said battery.

\* \* \* \* \*